(12) United States Patent
Korpai

(10) Patent No.: US 6,817,128 B2
(45) Date of Patent: Nov. 16, 2004

(54) SCREEN BORDER

(76) Inventor: James Korpai, 67-23 50th Ave., Woodside, NY (US) 11377

( * ) Notice: Subject to any disclaimer, the term of this patent is extended or adjusted under 35 U.S.C. 154(b) by 0 days.

(21) Appl. No.: 10/419,688

(22) Filed: Apr. 21, 2003

(65) Prior Publication Data

US 2004/0079016 A1 Apr. 29, 2004

Related U.S. Application Data

(63) Continuation of application No. 09/833,534, filed on Apr. 12, 2001, now Pat. No. 6,550,172.
(60) Provisional application No. 60/198,021, filed on Apr. 18, 2000.

(51) Int. Cl.[7] .................................................. A47G 1/06
(52) U.S. Cl. ............................................................ 40/725
(58) Field of Search ........................ 40/798, 799, 725; 248/917, 918

(56) References Cited

U.S. PATENT DOCUMENTS

| | | |
|---|---|---|
| 2,593,195 A | 4/1952 | Rosenberg et al. |
| 4,117,613 A | 10/1978 | Hosker |
| 4,869,565 A | 9/1989 | Bachman |
| 5,104,087 A | 4/1992 | Wentzloff et al. |
| 5,197,213 A | 3/1993 | Borden |
| 5,398,905 A | 3/1995 | Hinson |
| 5,465,514 A | 11/1995 | Ulysse |
| 5,549,267 A | 8/1996 | Armbruster et al. |
| 5,564,209 A | 10/1996 | Zagnoli |
| 5,638,096 A | 6/1997 | Schwartz |
| 5,672,105 A | 9/1997 | Curic |
| 5,678,792 A | 10/1997 | Arguin et al. |
| 5,890,603 A | 4/1999 | Arguin et al. |

Primary Examiner—S. Joseph Morano
Assistant Examiner—Robert J. McCarry, Jr.
(74) Attorney, Agent, or Firm—Katten Muchin Zavis Rosenman

(57) ABSTRACT

A screen border has a plurality of chambers that are arranged around the perimeter of the border. The chambers are adapted to receive appearance-changing objects, such as image-bearing strips or decorative, three-dimensional objects, therein. Appearance-changing objects may be easily inserted into and withdrawn from the interior of the chambers through access areas provided on the border. The border may be integrally formed into a housing, or it may be removably or permanently attached to an existing housing. A hinged connection may be incorporated into the construction of the border so that the border may be temporarily pivoted away from the screen to allow a user to gain access to controls or the like positioned behind the border.

21 Claims, 14 Drawing Sheets

SCREEN BORDER

CROSS-REFERENCES TO RELATED APPLICATIONS

This application is a continuation of application No.: 09/833,534 filed Apr. 12, 2001, now U.S. Pat. No. 6,550,172 which claims the benefit of earlier filed provisional application No.: 60/198,021 filed on Apr. 18, 2000.

FIELD OF THE INVENTION

This invention relates to a border for a computer screen in general, and more particularly to a border having an appearance that is variable and customizable and capable of receiving personalized images inserted therein.

BACKGROUND OF THE INVENTION

In a day where everything seems to be personalized and almost everyone owns a display monitor of some sort, it seems impossible to offer a display monitor that can suit the tastes of each individual. For instance, most monitors are provided in a single color, usually black, gray, white or some other neutral color. While such a color scheme may be compatible with most surroundings, it is boring to look at. Thus, considering that most people spend their work lives in front of a computer screen, there is a need for a computer screen that is attractive, interesting in appearance and appealing to behold.

The apparatus of the present invention addresses such need, and enables users to customize their display monitors to fit their personal tastes, decor, or just the way they feel. The present invention allows a person to change the look of their monitor as their tastes change, and consists of a series of display chambers disposed about the peripheral edge of the monitor that are adapted to receive customized display items. A countless variety of images or objects from various sources may be inserted into such chambers to achieve a desired look. Images may include everything from baby photos to vacation pictures, themes to fit certain occasions and holidays, or photos and logos of a favorite sports team. Everything from personal creations, magazine clippings, to images downloaded from the Internet may be displayed in such display chambers to enhance and customize the appearance of a monitor.

DESCRIPTION OF THE PRIOR ART

In the past, similar devices have been proposed to alter the appearance or offer a useful element to a display monitor. Such devices are usually fixed or otherwise secured to the display monitor in some fashion. Unlike the prior art, however, the screen border of the present invention, once secured to the monitor, may be temporarily displaced to provide the user with access to control buttons positioned on the front of the monitor housing.

In a preferred embodiment, the screen border of the invention is hingedly connected to the monitor, such that it may be pivoted from a position adjacent or against the monitor display screen to a position away from the monitor. Usually, the hinges are positioned on the top of the screen border and monitor, such that the border may be pivoted upwardly toward the user and away from the screen. Alternatively, the hinges may be positioned on the side of the screen border and monitor, such that the border may be pivoted to the side away from the screen. Thus, when it is desired to adjust the monitor settings or turn the power on or off, the border of the invention may be temporarily displaced without having to painstakingly remove the entire unit from the monitor housing.

The prior art is also limited to devices consisting of removable and interchangeable display components and does not offer the ability to insert and change images without the use of some means to attach or affix the images to the device. The computer screen border of the present invention provides a user with the ability to manipulate and interchange images and objects as many times as desired.

For instance, U.S. Pat. No. 4,869,565 discloses a display apparatus which is affixed to the sides and top of a computer monitor. Channel members are provided along the sides and top to hold large "L" shaped display members. Images are then attached to the display members, not inserted into the channels themselves.

U.S. Pat. No. 5,104,087 discloses a note/memo board designed to surround a computer display housing on only three sides. The board attaches to the display housing with the use of angle brackets backed with VELCRO® material with matching strips on the sides and top of the device. The note/memo board, however, mounts to the back of the computer screen, not on the actual face, which positions the screen beyond the user's field of focus.

U.S. Pat. No. 5,398,905 discloses a die-cut display board for a computer video monitor wherein a cardboard, plastic, or foam back is secured to the computer video monitor by means of double-stick tape or a VELCRO® material. The middle region, where the screen would appear, is scored such that the middle may be pushed apart creating tabs to be folded in towards the rear of the device to lie on the top and the sides of the monitor to form an opening to view the screen.

U.S. Pat. No. 5,549,267 discloses a frame assembly that adheres to the face of a computer monitor by means of a repositionable pressure sensitive adhesive. The front surface of the frame is adapted to have sheets of paper and other objects releasably adhered thereto. The frame assembly may also include different sized central cut outs to fit devices having different sized view able surfaces.

U.S. Pat. No. 5,564,209 discloses an apparatus for positioning around a screen comprising, a strap of a flexible material with a circumference that allows it to be positioned around the upper surface, lower surface and side surfaces of the screen that assumes a rectangular configuration when placed therearound. A decorative attachment, in the form of a doll, sports event scene, beach scene or the like, may than be supported by the strap.

U.S. Pat. No. 5,638,096 discloses a display frame specifically for computer monitors. The display frame is adhesively affixed to the front surface of a monitor. In order to change the decorative image of the frame, the user must replace the frame with a frame having a different image. The frame also does not allow easy access to control buttons that may exist on a monitor housing. Such frame may also consist of a plurality of slots in which the corners only of photographs are placed.

U.S. Pat. No. 5,678,792 discloses a display device and method of attaching objects such as pictures, notes and the like to appliances. Such device consists of a substantially flexible, lengthwise deformable band that is extended around the perimeter of an appliance. Objects are secured in place by the deformable material creating frictionous contact with the appliance. U.S. Pat. No. 5,890,603 discloses a similar display device.

U.S. Pat. No. 5,197,213 discloses a decorative frame having a plurality of enclosure members for retaining appearance-altering material. The enclosure members are adhesively connected to each other and the frame backing, such that the appearance-altering material cannot be repeatedly changed at will. A main objective of the '213 device is to permit the changing of a picture or mat which surrounds the picture without simultaneously affecting the appearance-altering material disposed within the enclosure members.

U.S. Pat. No. 5,465,514 discloses a readily variably decorative self-standing picture frame. This picture frame consists of recessed sides and end walls which are sufficient to receive a glass plate, a suitable illustration, and a protective backing layer having a pedestal to support the frame in an upward position. The '514 frame also includes a number of stud members placed on the rear of the back layer for securing the frame to a back wall. Disposed in the recessed walls are transparent cylindrical tubes adapted to receive therein varied changeable decorative enclosures. The length of such cylindrical tubes extend into portions of corner recesses, which are adapted to receive and secure retainers. These retainers overlap the ends of the cylindrical tubes therefore holding the tubes securely in place. In order to change a decorative enclosure, such tubes must be removed entirely from the frame.

U.S. Pat. No. 2,593,195 discloses a backing board for picture frames having a plurality of metal strips adjustable thereacross. Each of the metal strips consist of prongs near the ends allowing a piercing engagement with the backing board, which allows pictures of different sizes to be secured in different positions against the backing board.

U.S. Pat. No. 5,672,105 discloses a monitor mask utilizing a plurality of pages which partially surround a computer screen. The pages are bound such that they may be individually moved.

OBJECTS OF THE INVENTION

It is an object of the present invention, therefore, to provide a bordering area for a screen that can be customized in appearance.

It is a further object of the present invention to provide a screen border having chambers for the receipt and display of image-bearing material.

It is a further object of the present invention to provide a bordering area that allows for quick and easy insertion and exchange of image-bearing material within such chambers.

It is a further object of the present invention to provide a screen border that is hingedly attached to a screen, allowing the border to be pivoted away from the screen to gain access to control buttons or the like without necessitating the removal of the border from the screen to accomplish the same task.

Still other objects and advantages of the invention will become clear upon review of the following detailed description in conjunction with the appended drawings.

SUMMARY OF THE INVENTION

The computer screen border of the present invention comprises a plurality of chambers that are adapted to receive appearance-changing objects therein. Such objects may be image-bearing strips or decorative, three-dimensional objects. The chambers are positioned around the perimeter and are secured to the screen border, with the interior of such chambers being easily accessible such that the image-bearing strips or objects may be inserted into and removed therefrom without necessitating removal of the chambers or the border from the screen. The border of the invention may be integrally formed into a monitor housing, or it may be removably or permanently attached to an existing monitor housing. A hinged connection may be incorporated into the construction of the border so that the border may be temporarily pivoted away from the computer screen to allow a user to gain access to controls or the like positioned behind the border.

DETAILED DESCRIPTION OF THE PREFERRED EMBODIMENTS

Figure 1:
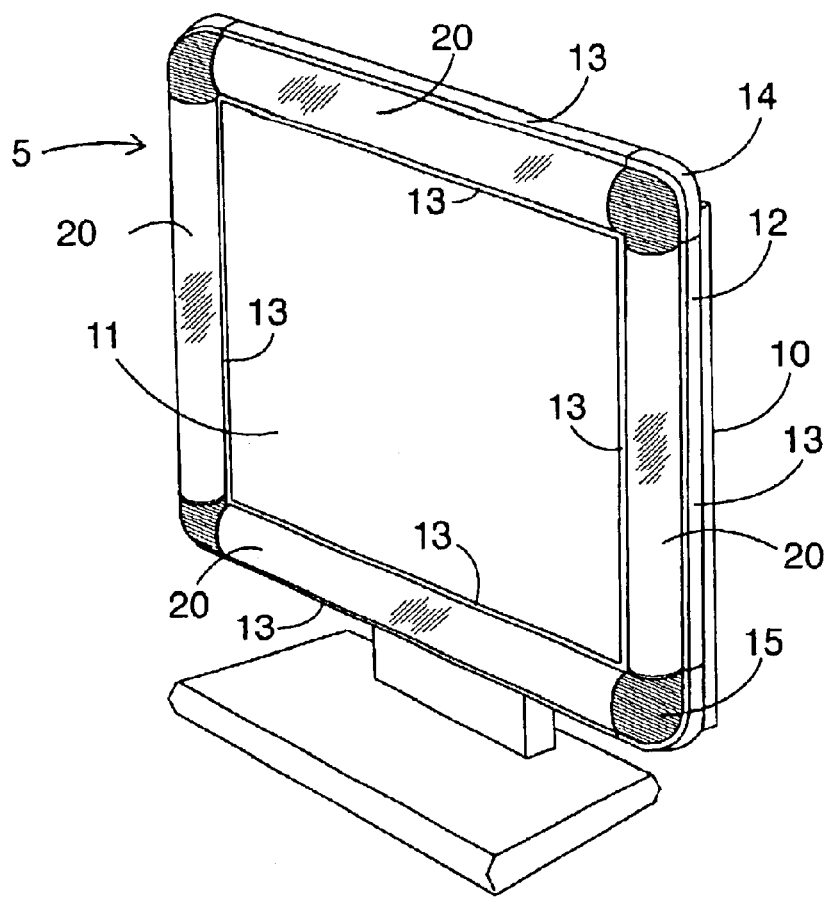
FIG. 1 is a perspective view of a screen border of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
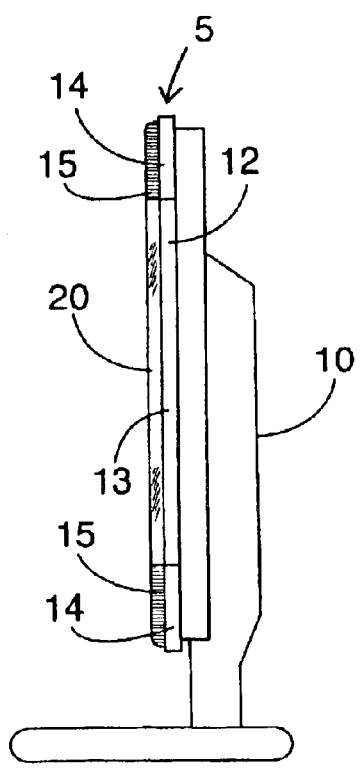
FIG. 2 is a side view of FIG. 1.
Figure 3:
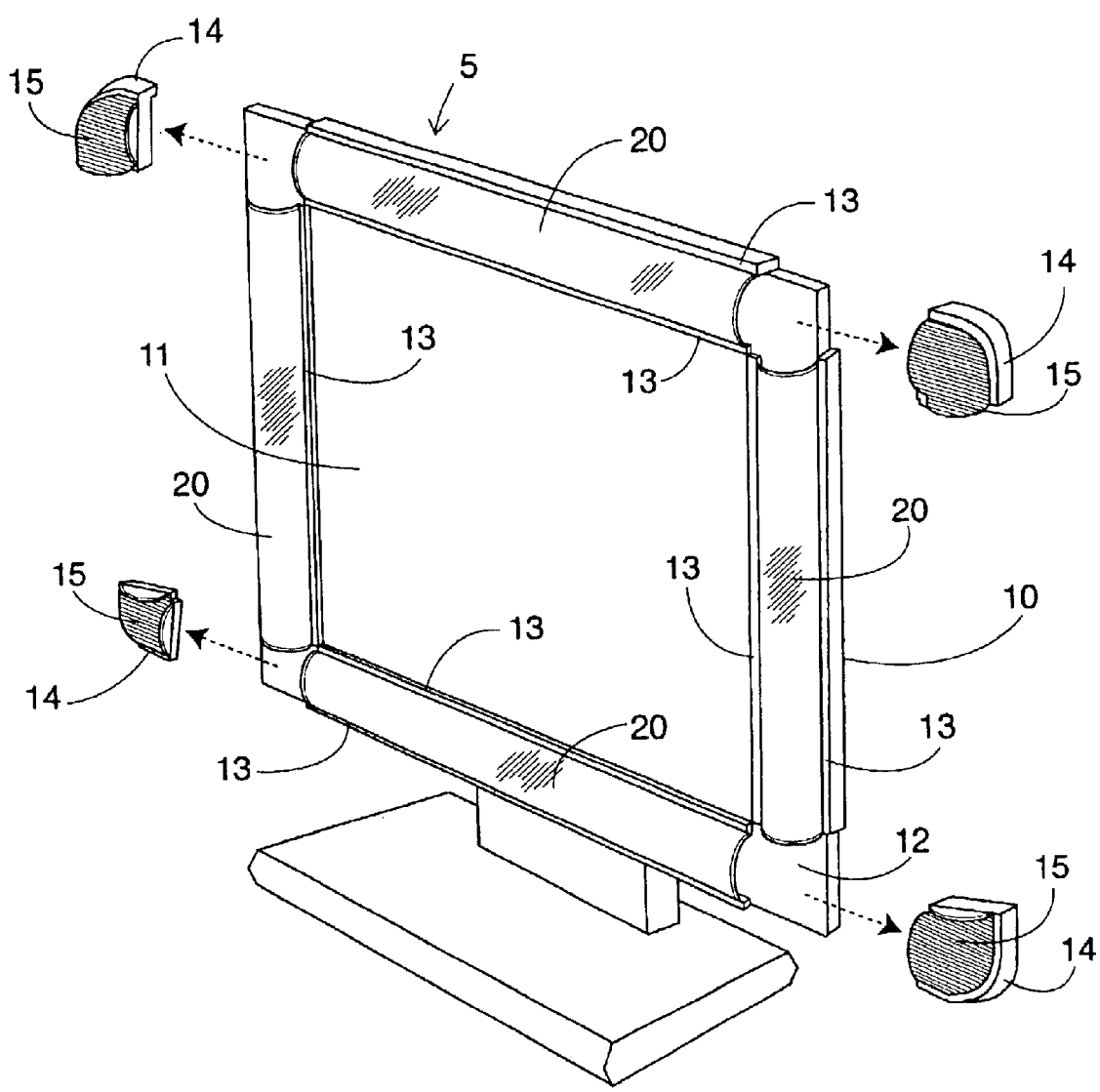
FIG. 3 is a perspective view of the border of FIG. 1 showing the removal of the corners pieces of the border of the invention.

FIG. 1 is a three-dimensional view and FIG. 2 is a side view of the screen border 5 of the present invention shown attached to a monitor 10 having a screen 11. While a flat-panel monitor housing 10 is shown in the appended drawings, the border of the invention 5 will be usable with other monitor types as well (see, for example, FIGS. 21 and 22). The border 5 preferably comprises a plurality of cover members 20 positioned around the perimeter of a base member 12, such members 20 being adapted to display image-bearing elements 16 as discussed below and defining a central opening in said base member 12 through which the monitor screen 11 is viewable. Outwardly projecting side walls 13 (see also FIGS. 9, 13, 15, etc.) extending from the base member 12 and positioned along the longitudinal edges of the cover members 20 define a receiving chamber between the members 20 and the base member 12, such receiving chamber being adapted to accommodate image-bearing elements therein as will be described below. Corner pieces 14 preferably having colored attachments 15 are disposed along the corners of the base member 12, such that the corner pieces 14 in combination with the cover members 20 define a continuously-appearing border around said base member 12. While such corner pieces 14 are described with attachments 15, such attachments are not necessary for the operation of the border of the invention. The corner pieces 14 are removable from the border 5 (FIG. 3) and preferably reattachable thereto by a friction fit connection between the corner pieces 14 and either the base member 12 or the receiving chambers. However, other methods of connection between the corner pieces 14 and the border 5, such as a tongue and groove, male/female, adhesive, Velcro® connection or the like, may be used.

Figure 4A:
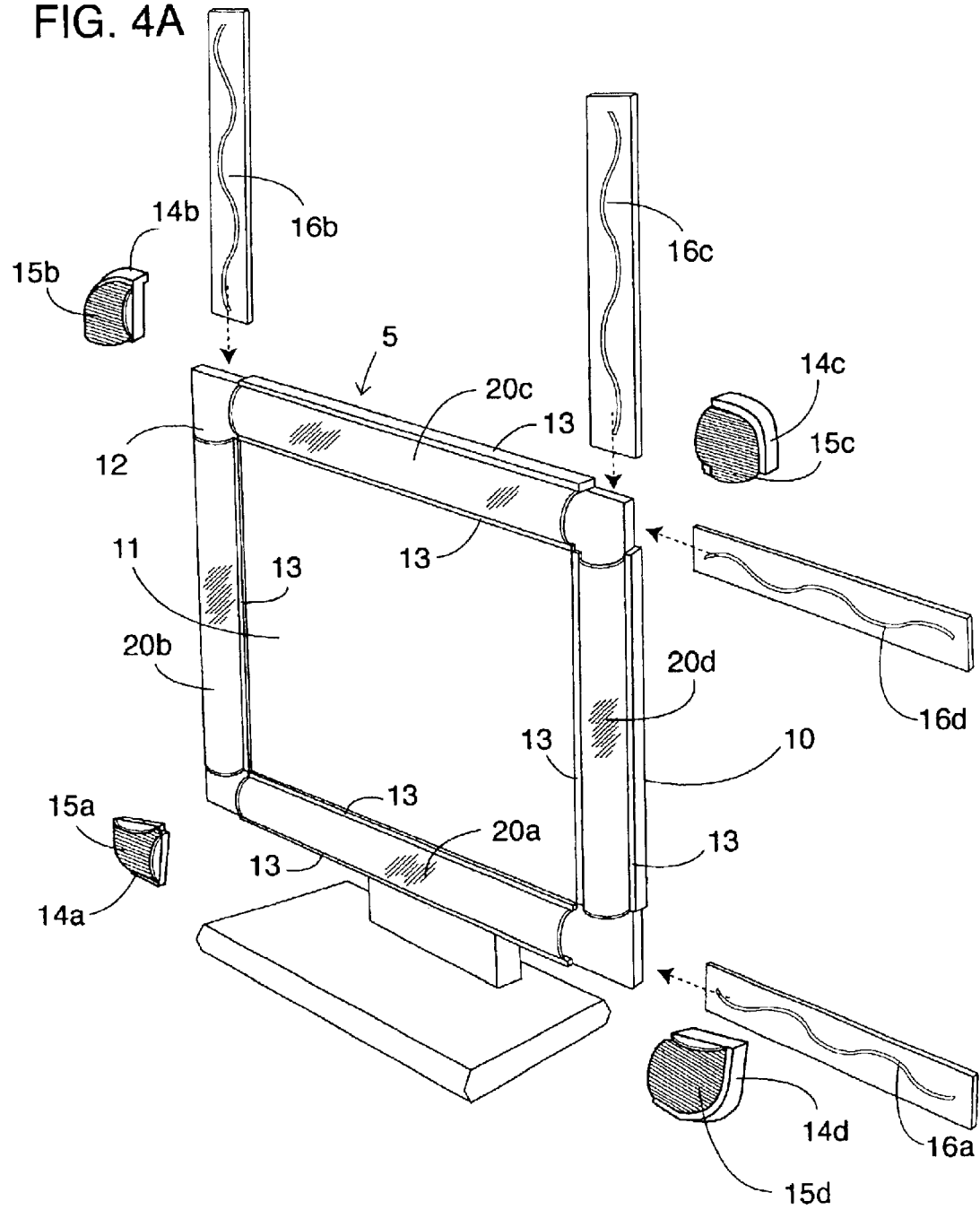
FIG. 4A illustrates the insertion of images into the receiving chambers of the present invention and FIG. 4B illustrates a border of the invention having images positioned within the receiving chambers.
Figure 4B:
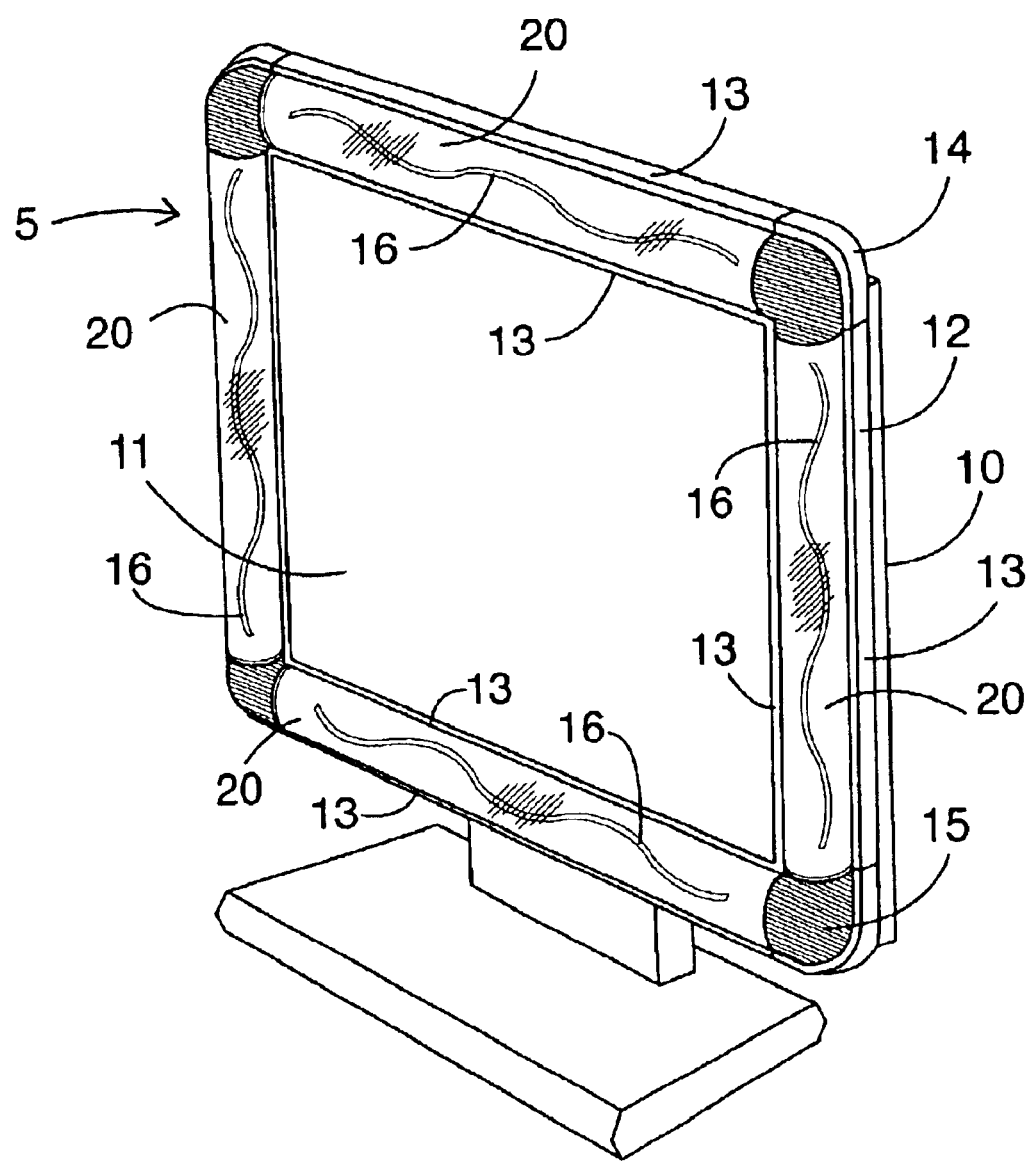

The cover members 20 are preferably affixed to the base member 12 between the side walls 13, such that the receiving chambers are dimensioned to receive and display image-bearing inserts 16 therein (FIGS. 4A and 4B). In this regard, cover members 20 are preferably formed from a hollow, transparent or translucent material so that the image-bearing inserts 16 are clearly viewable through said members 20 (FIG. 4B). The inserts 16 preferably have the same longitudinal dimension (length) as the members 20, and the corner pieces 14 preferably act as barriers, so that the inserts 16 are bounded by the cover members 20 and the corner pieces 14 when the corner pieces 14 are attached to the border 4. Furthermore, there preferably exists a slight gap between the edges of the cover members 20, the side walls 13 and the base member 12 for accommodating the image-bearing inserts (see, for example, FIGS. 15 and 17). However, such slight gap does not have to be present, and the receiving chambers can instead be defined between the cover members 20 and the base member 12.

FIG. 4A illustrates a plurality of inserts 16a–16d (collectively defined by the reference number 16), a plurality of corner pieces 14a–14d (collectively defined by the reference number 14), a plurality of attachments 15a–15d (collectively defined by the reference number 15) and a plurality of cover members 20a–20d (collectively defined by the reference number 20). With the corner pieces 14 removed from the border 5, the inserts 16 may be added to the receiving chambers as follows, it being understood that such process is only illustrative of one potential process for creating the border of the invention. First, corner piece 14a is attached to the border 5 so that insert 16a can be inserted into the receiving chamber defined by cover member 20a in the direction of the arrow as shown. Corner piece 14a acts as a stop, preventing the overinsertion of insert 16a through the receiving chamber. Once insert 16a has been fully inserted, corner piece 14d is attached to the border 5, thereby completing the lower edge of the border 5. With the corner pieces 14a and 14d in place, inserts 16b and 16c may be dropped into receiving chambers defined by cover members 20b and 20d, such that corner pieces 14a and 14d act as stops preventing such inserts 16b and 16c from falling completely through such chambers. Once inserts 16a–16c are in place, corner piece 14b is attached to the border 5 and insert 16d is advanced through the receiving chamber defined by cover member 20c until it impacts corner piece 14b. Finally, corner piece 14c is attached to complete the border 5 (FIG. 4B).

All of the attachments 15a–15d provided on the corner pieces 14a–14d may be the same in appearance, or each may be different as the case may be, it being understood that the attachments 15 provide yet a further means for varying the overall appearance of the border 5. Such attachments 15 may also be colored, solid, striped, have a design that matches the design of the inserts 16, or the like. Also, each of the inserts 16a–16d may have a different design, image or the like, or all of the inserts 16 may have the same design, image, appearance or the like, depending on the desires of the user. Furthermore, the cover members 20, while preferably transparent or translucent, may also be adorned with designs, embossings, engravings or the like (not specifically shown). Thus, the overall design of the border 5 of the invention provided by the combination of the corner pieces 15, cover members 20 and inserts 16 may be varied and customized according to the desires of the user.

The general concept of the screen border 5 of the present invention has been described in connection with FIGS. 1–4B. However, there are a variety of ways such border 5 can be operated and applied to a computer screen 10 or the like.

Figure 5:
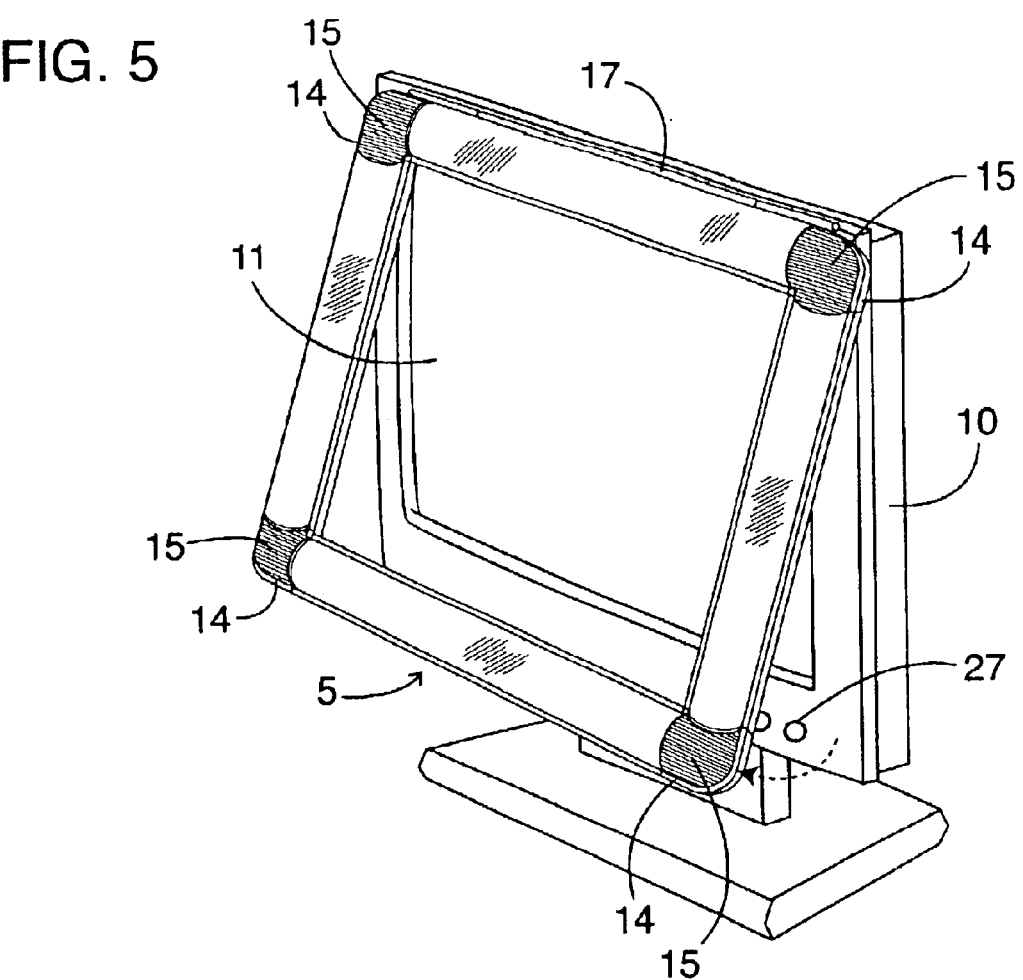
FIG. 5 is a perspective view of one embodiment of a screen border of the invention hingedly connected to a monitor.
Figure 6:
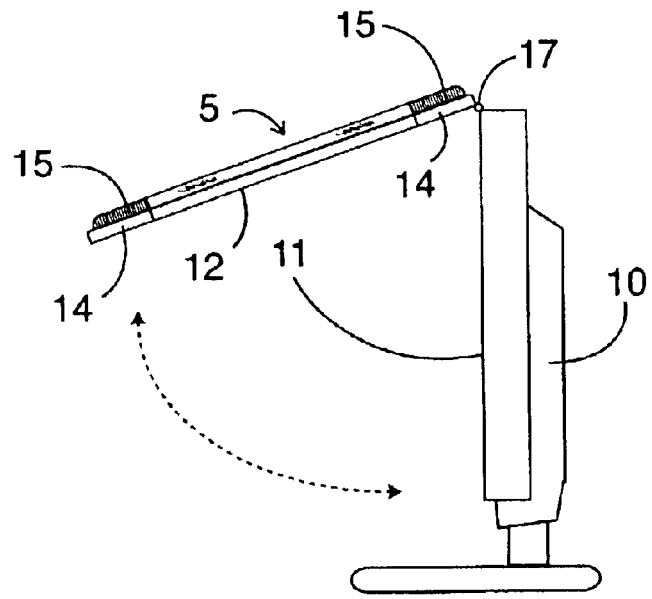
FIG. 6 is a side view of the border of FIG. 5 showing the pivoting movement of the border with respect to the monitor.

In one embodiment as shown in FIGS. 5 and 6, the border 5 of the present invention can be integrally connected to the monitor by a hinge connection 17 or the like, which allows the border 5 to be pivoted away from the screen 11 to provide access to control buttons 27 or the like situated on the monitor housing. Such hinge connection 17 may be configured with a hold position to retain the border 5 in a pivoted position as shown in FIG. 6 without requiring that the user constantly support the border 5. The border 5 may be pivoted outward only slightly, or to a position that is substantially perpendicular to said screen. Or, such hinge connection 17 may require that the user support the border 5 at all times during pivoting. In the embodiment of FIGS. 5 and 6, the border 5 will be in a rest position directly adjacent the computer monitor 10 (see FIG. 1 for example).

Figure 7:
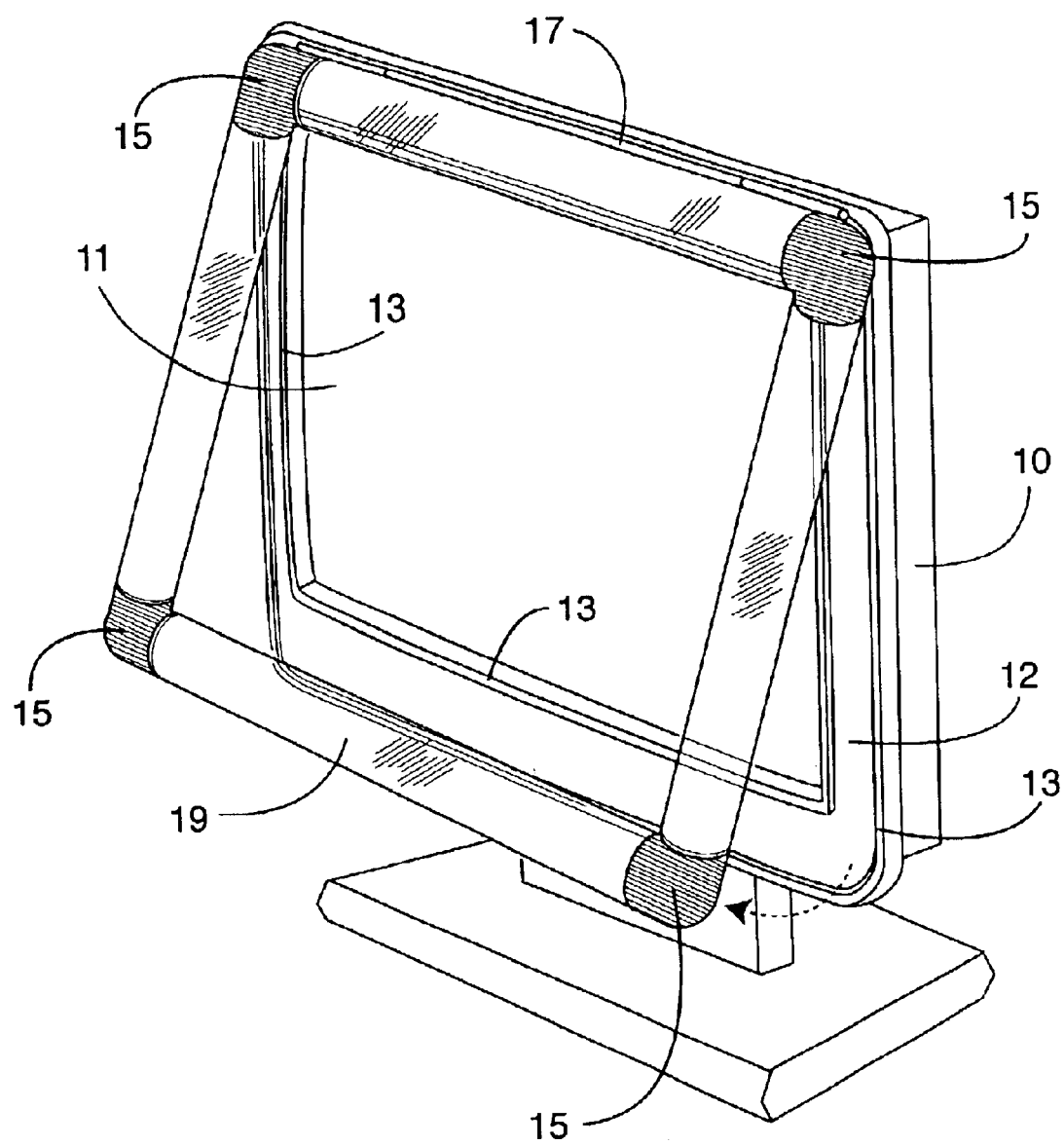
FIG. 7 is a perspective view of another embodiment of a border of the present invention, wherein a continuous screen border is hingedly connected to a base member that has been attached to or integrally formed into a monitor.
Figure 8:
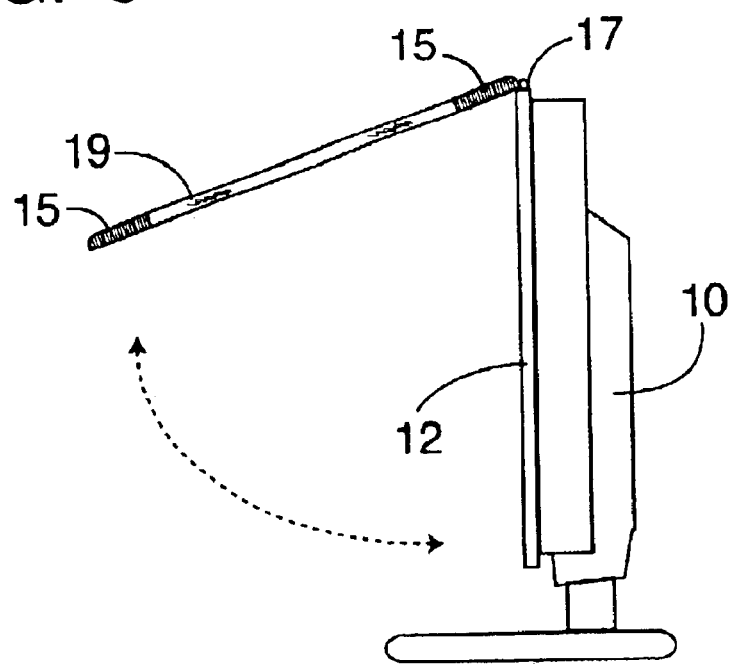
FIG. 8 is a side view of the border of FIG. 7 showing the pivoting movement of the continuous border with respect to the monitor.
Figure 9:
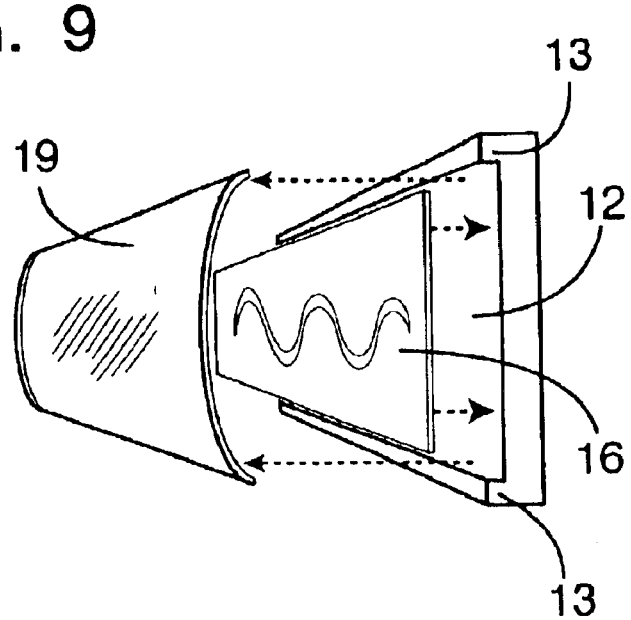
FIG. 9 is a detailed perspective view showing the insertion of an image-bearing insert in accordance with the embodiment of FIGS. 7 and 8.

FIGS. 7–9 illustrate another embodiment of the border of the present invention, wherein the base member 12 is attached to the monitor 10, and the cover members and corner pieces are connected to form a continuous member 19 that is hingedly attached to the base member 12. As shown in FIG. 9, the combination of the side walls 13 and the base member 12 create a cavity along the base member 12 for receipt of the inserts 16, which cavity is then enclosed by the continuous display member 19 when such member 19 is pivoted into a position adjacent the monitor 10.

Figure 10:
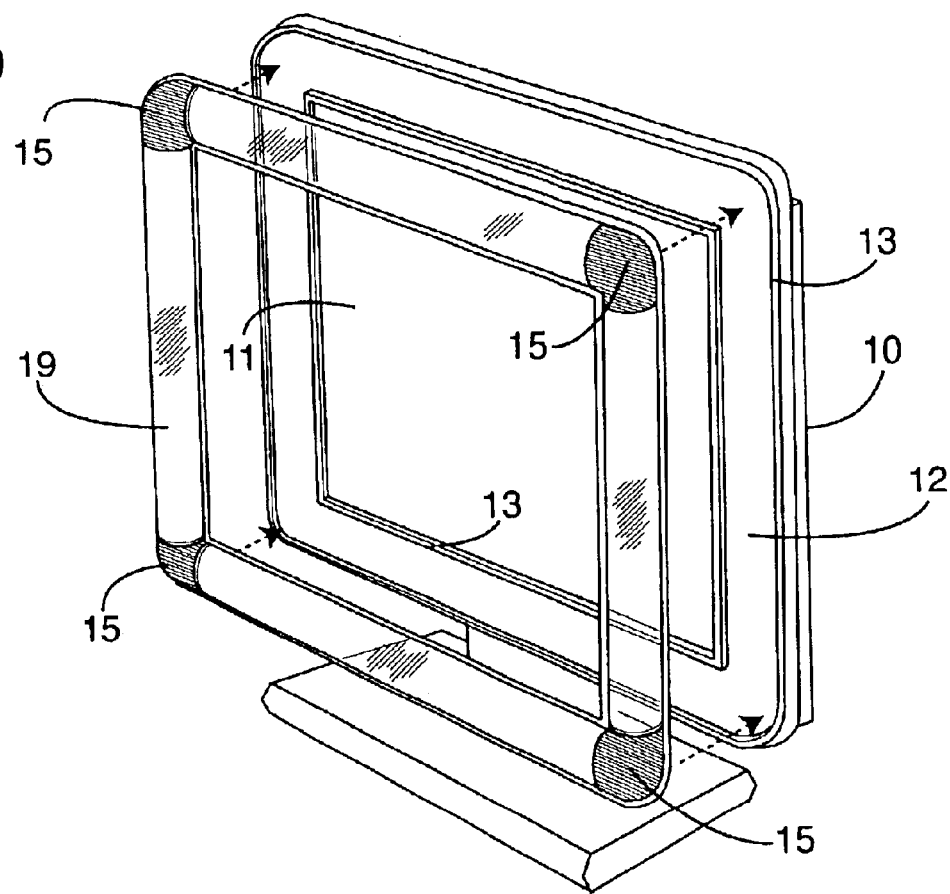
FIG. 10 is a perspective view of another embodiment of a border of the present invention, wherein a continuous screen border is completely removable from the monitor and snap fit or otherwise engageable with the monitor.
Figure 11:
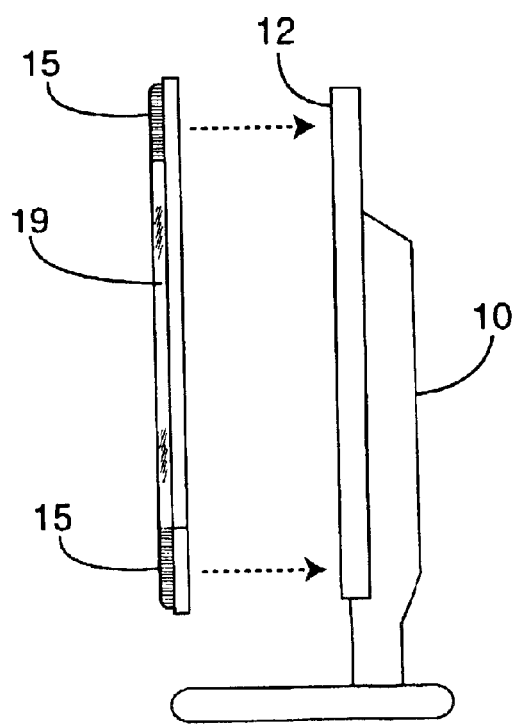
FIG. 11 is a side view of the border of FIG. 10 showing the engagement of the continuous border with respect to the monitor.

FIGS. 10–11 illustrate another embodiment of the border of the present invention, wherein the base member 12 is attached to the monitor 10, and the cover members and corner pieces are connected to form a continuous member 19 that is snapped to or otherwise completely removable from, and engageable with, the base member 12. Inserts 16 are added to the border of FIGS. 10–11 as illustrated in FIG. 9. In the embodiments illustrated in FIGS. 7–11, decorative attachments 15 may be added to the continuous display member 19 as desired.

Figure 12:
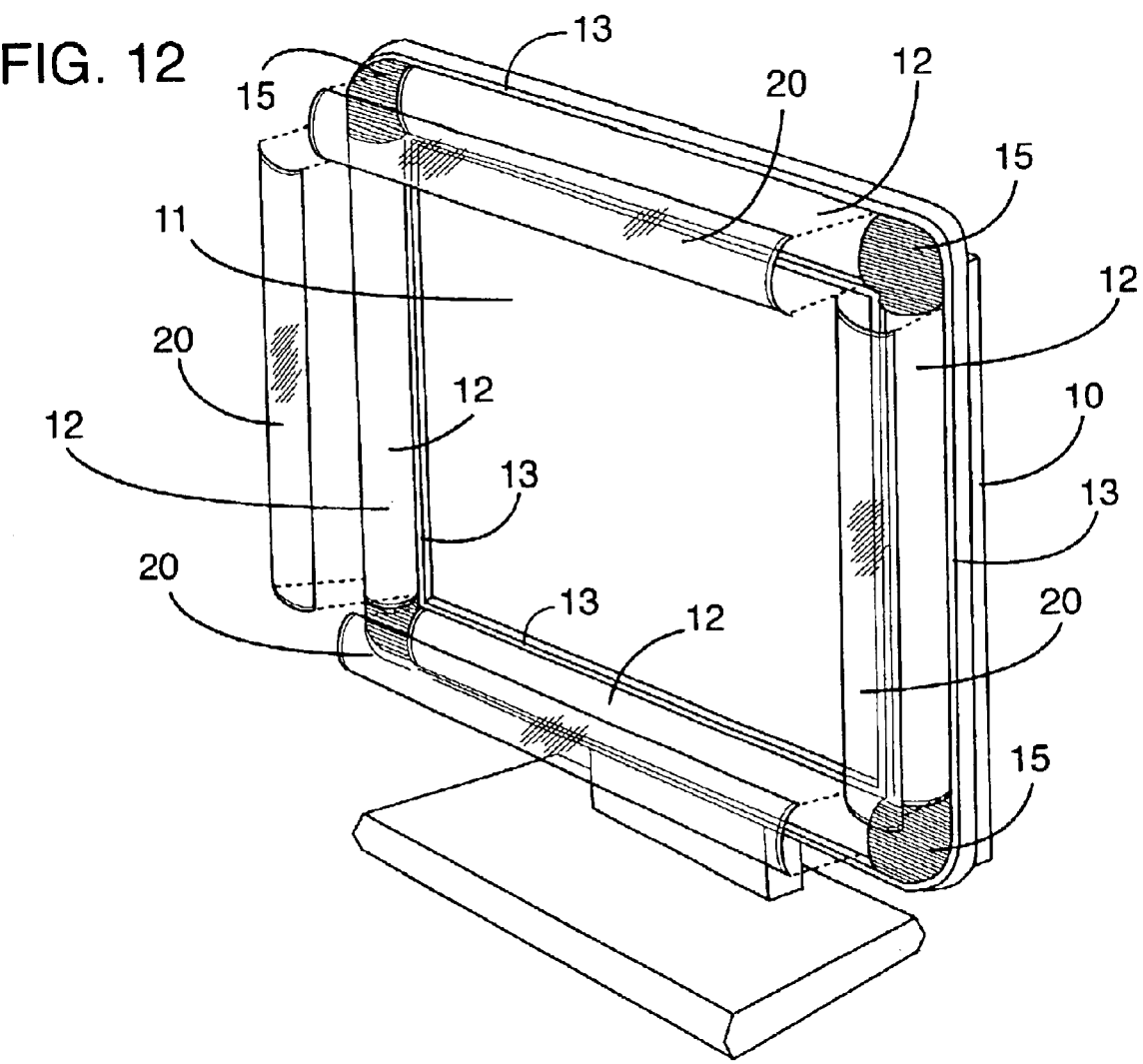
FIG. 12 is a perspective view of another embodiment of a border of the present invention, wherein the receiving chambers are completely removable in order to gain access to and insert and/or image-bearing inserts.
Figure 13:
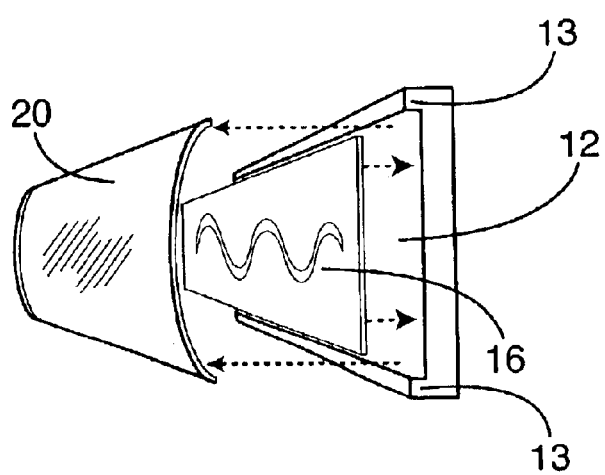
FIG. 13 a detailed perspective view showing the insertion of an image-bearing insert in accordance with the embodiment of FIG. 12.
Figure 14:
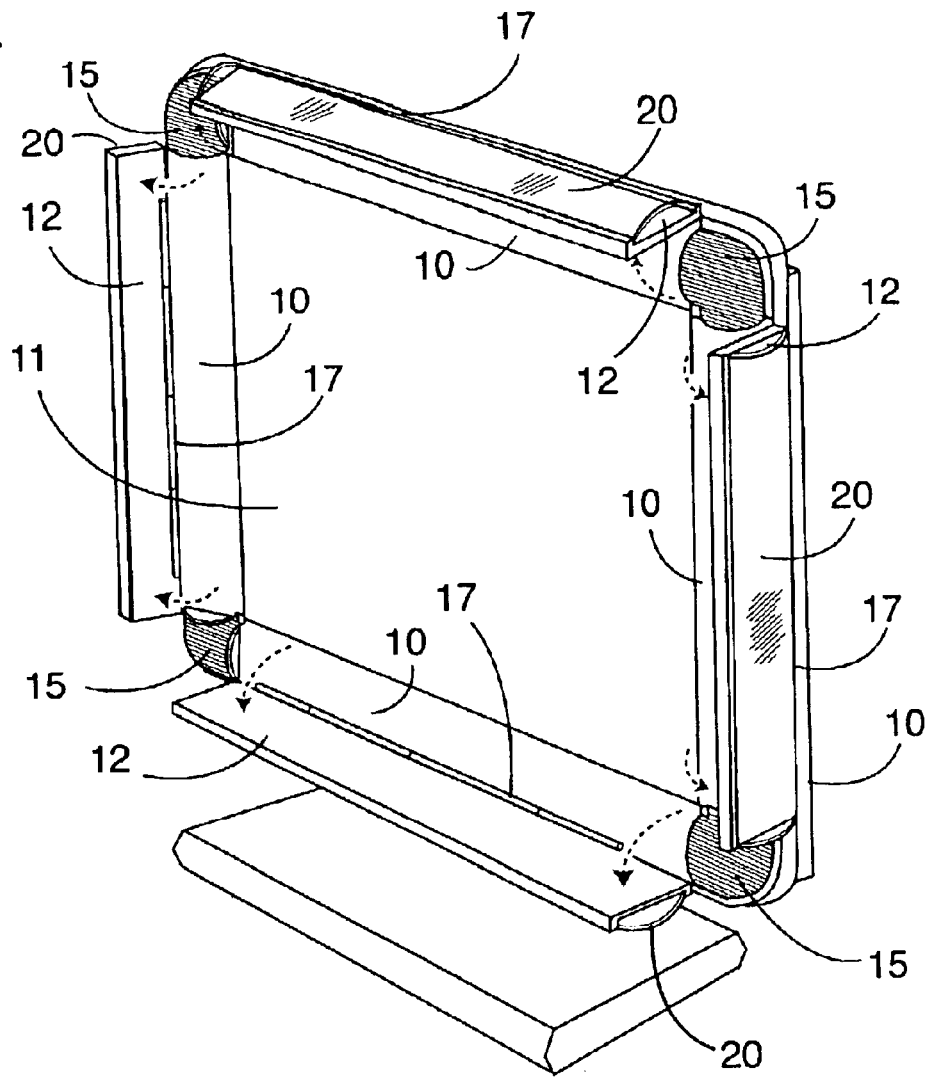
FIG. 14 is a perspective view of another embodiment of a border of the present invention, wherein the receiving chambers are separately hingedly attached to the border.
Figure 15:
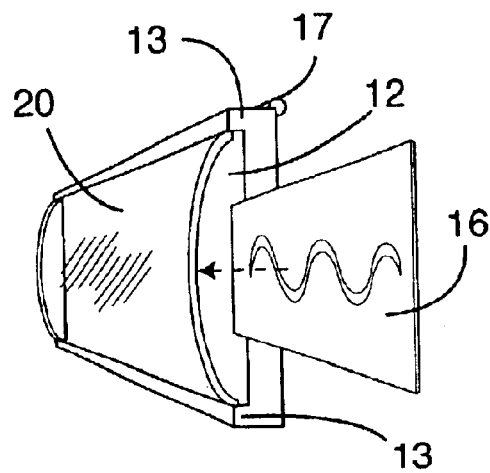
FIG. 15 is a detailed perspective view showing the insertion of an image-bearing insert in accordance with the embodiment of FIG. 14.

As noted above with respect to the embodiment of FIGS. 1–4B, it is preferred if the cover members 20 are secured or fixed to the base member 12. However, such members 20 may be completely removable from the base member 12 as shown in FIGS. 12–13, or separately hingedly connected to the base member 12 as shown in FIGS. 14–15. In the embodiment of FIG. 12, for example, each of the members 20 are completely removable from the base member 12 by means of a snap fit engagement or the like. Thus, as shown in FIG. 13, an image-bearing insert 16 is inserted into the receiving chamber defined between the base member 12 and side walls 13 after the cover member 20 is disengaged from the base member 12. In the embodiment of FIG. 14, for example, each of the receiving chamber sections, defined by a cover member 20, base member section 12 and side wall sections 13, is hingedly attached to the monitor 10 by means of a hinge 10. Thus, as shown in FIG. 15, an image-bearing insert 16 is inserted into the receiving chamber defined between the cover member 20, base member 12 and side walls 13. Preferably, an image-bearing insert 16 is inserted into a slight opening or gap defined between the ends of the cover member 20, the base member 12 and side walls 13 as discussed above and as shown (see also FIG. 17).

Figure 16:
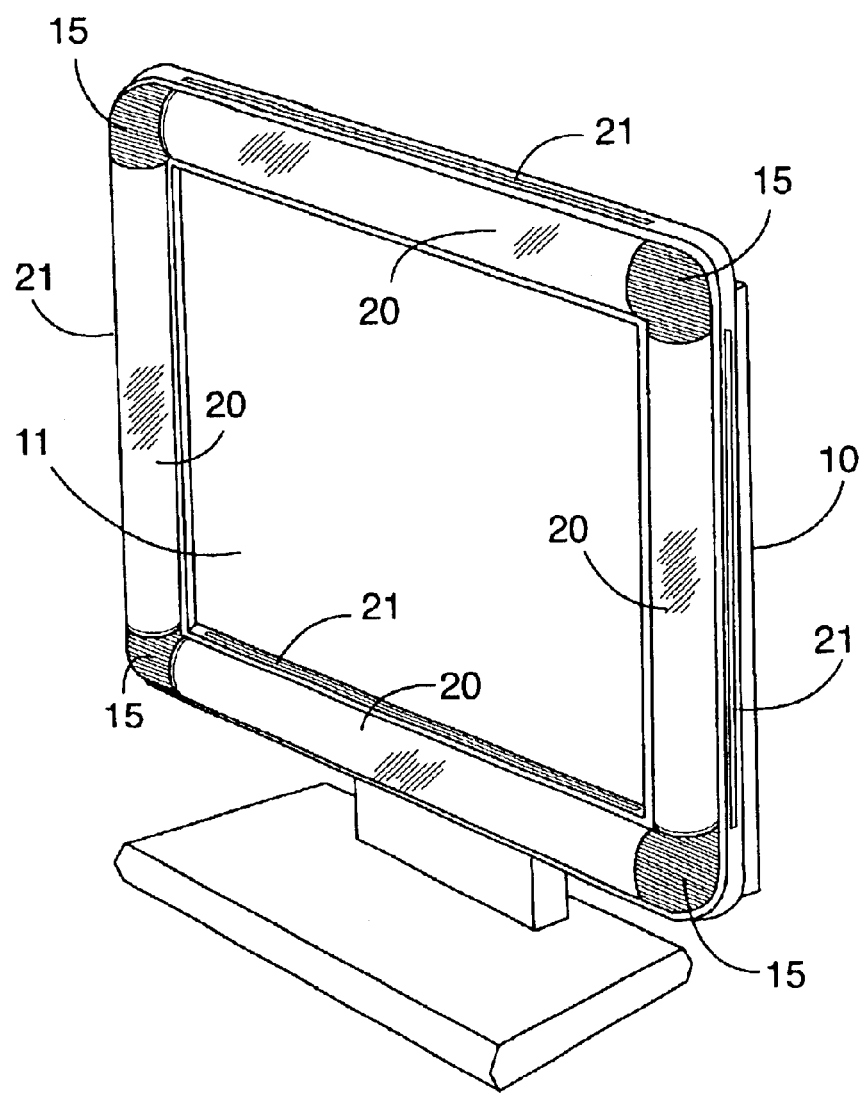
FIG. 16 is a perspective view of another embodiment of a border of the present invention utilizing slots along the base member and/or receiving chambers in order to gain access to insert and change image-bearing inserts.
Figure 17:
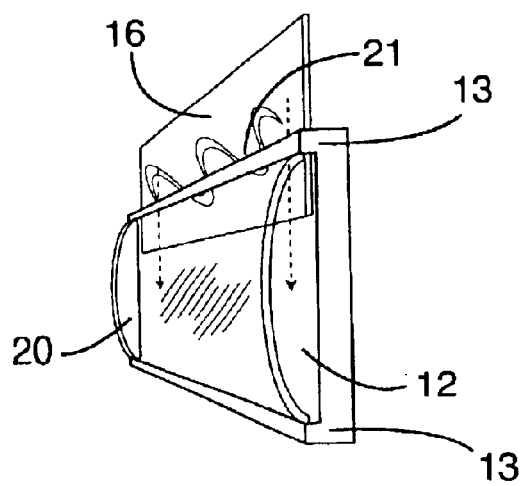
FIG. 17 is a detailed perspective view showing the insertion of an image-bearing insert through a slot in accordance with the embodiment of FIG. 16.

FIGS. 16–17 illustrate another embodiment of the present invention, wherein the base member 12 comprises openings or slots 21 along the outer peripheral edges to accommodate the passage of image-bearing inserts 16 therethrough. The lowermost cover member 20 might also have a slot 21 along its upper peripheral surface as shown in FIG. 16. Such inserts 16 should be dimensioned to extend partially outside said slots 21 when fully inserted within the receiving chambers so that said inserts 16 may be gripped and changed as desired.

Figure 18:
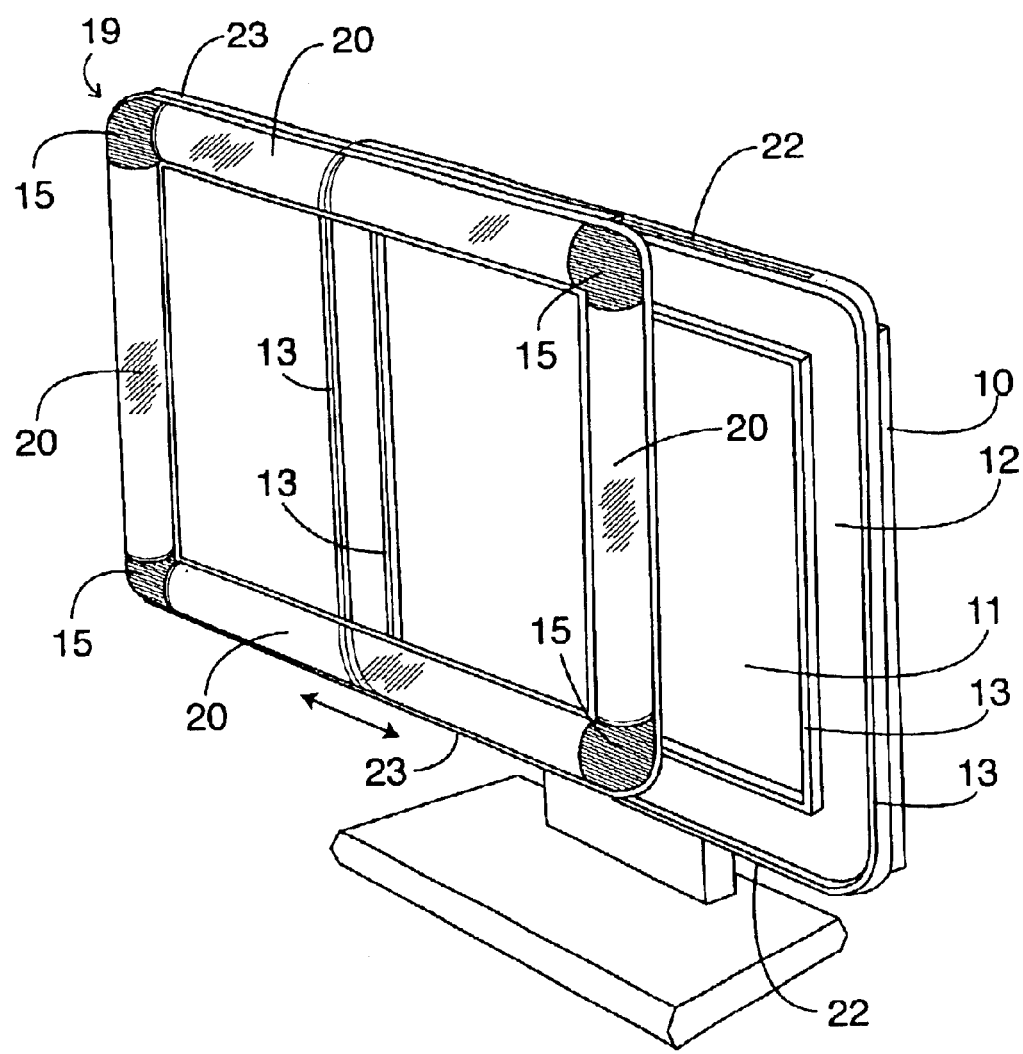
FIG. 18 is a perspective view of another embodiment of the border of the invention, wherein a the border is slidably attached to the monitor.

FIG. 18 illustrates yet another embodiment of the present invention, wherein the continuous member 19 further comprises an extending lip 23 on both the top and bottom peripheral edges as shown, which lips 23 ride inside a longitudinal channel 22 formed in the upper and lower peripheral edges of the base member 12. Thus, the continuous member 19 can move from side to side as shown without having to remove the entire member 19 to gain access to insert images 16.

Figure 19:
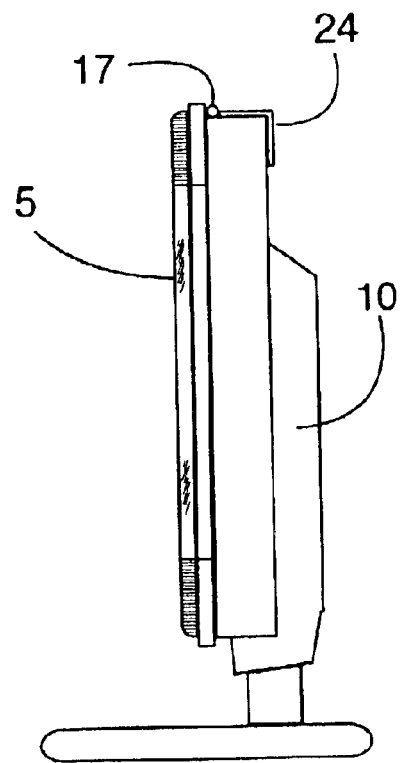
FIG. 19 is a side view of another embodiment of the border of the invention, wherein the border is mountable to a monitor as a separate unit by a hook-like clamp or bracket.
Figure 20:
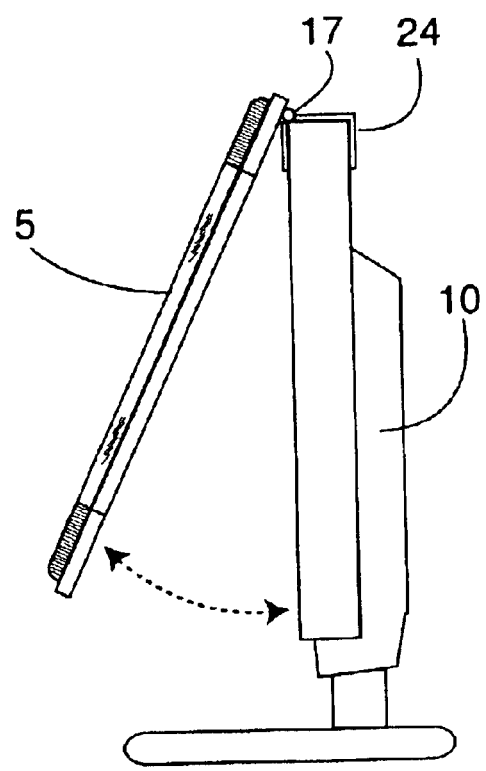
FIG. 20 illustrates the pivotal movement of the border of FIG. 19 about the top of the monitor, the border being mountable to a monitor by a clamp-like bracket.
Figure 21:
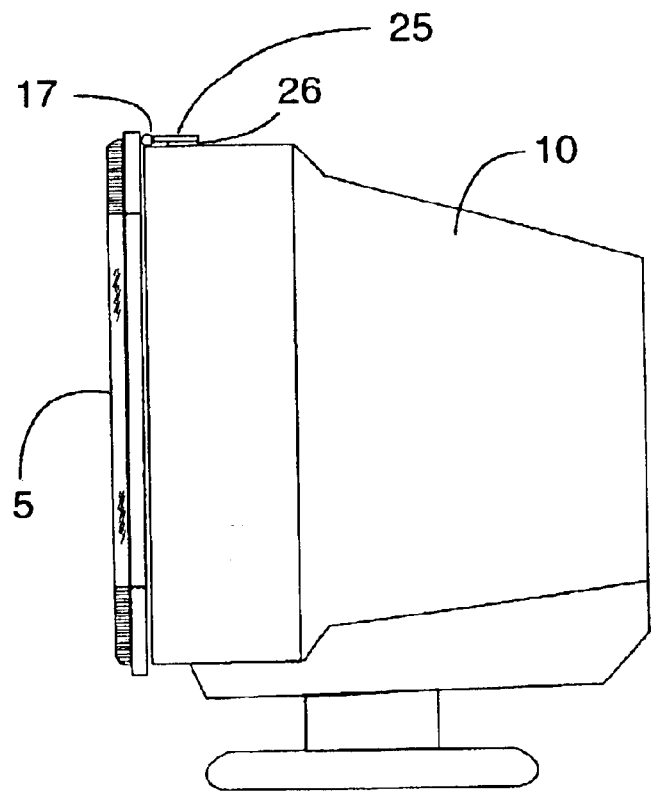
FIG. 21 is a side view of another embodiment of the border of the invention, wherein the border is mountable to a full-sized monitor by a flat bracket.
Figure 22:
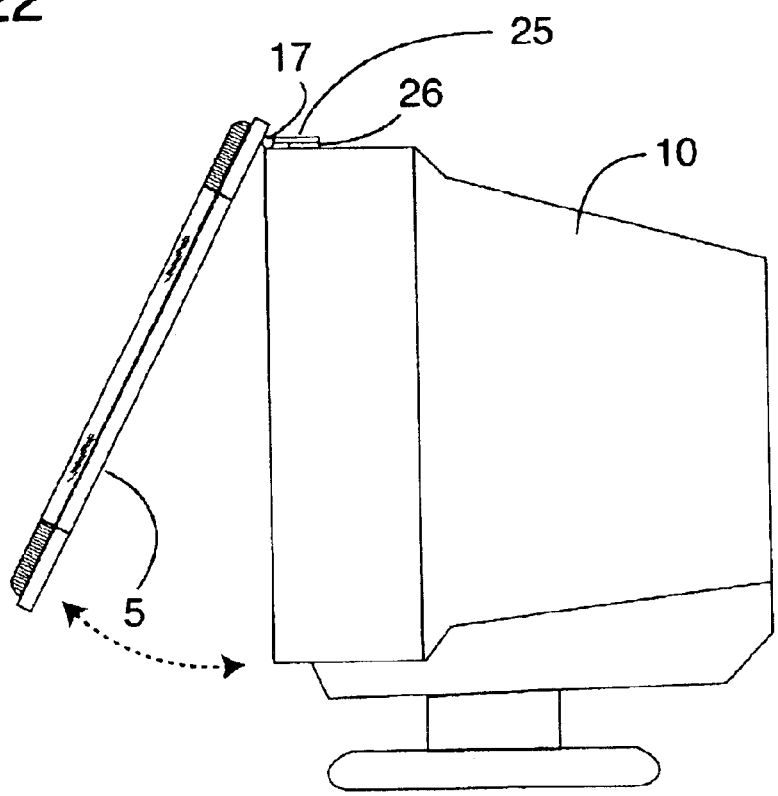
FIG. 22 illustrates the pivotal movement of the border of FIG. 21 about the top of the monitor.

FIGS. 19–22 illustrate yet another embodiment of the present invention, wherein the border 5 is formed as a separate unit from the monitor 5 and is separately and preferably removably attachable thereto. In FIGS. 19 and 20, the border 5 is supported on the flat screen monitor 10 by a hook-like or clamp-like bracket 24 to which the border is pivotally connected by a hinge 17. The bracket 24 may be temporarily adhesively attached to the monitor 10 or it may merely grip the monitor 10 as shown. In FIGS. 21 and 22, a flat bracket 25 is connected to the full-sized monitor 10 by a suitable attachment 25 and pivotally connected to the border 5 by a hinge 17. The semi-permanent attachment means 25 may be some type of adhesive material, Velcro® strips or the like. Other attachment means, such as by a snap connection or the like, are also contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A border for a computer screen having a screen area and a screen housing surrounding said screen area, said border comprising:

a) a base member adapted for removable engagement with said screen housing, said base member further comprising a plurality of corner members removably disposed at corners of said base member and a plurality of sides, said sides and corners defining an opening through which said screen area is viewable, b) a plurality of transparent cover members secured around said base member and positioned along said sides between said corner members, said cover members and portions of said base member adjacent said cover members defining a plurality of display chambers therebetween, c) means for introducing image-bearing elements into said display chambers via said removable corner members, and d) means for removably attaching the border to the screen housing.

2. A border in accordance with claim 1, further comprising a hinge for removably attaching said base member to said computer screen and wherein said base member is upwardly pivotable from a first position adjacent said computer screen to a second position away from said computer screen.

3. A border in accordance with claim 2, further comprising a bracket for securing said hinge to said computer screen.

4. A border in accordance with claim 1, wherein said means for introducing image-bearing elements into said display chambers further comprises slots positioned in said cover members.

5. A border in accordance with claim 1, wherein said cover members and said corner members are connected to form a unitary display member, said unitary display member being removably attachable to said base member.

6. A border for a screen having a screen area and a screen housing surrounding said screen area, said border comprising:

a) a base member adapted for engagement with said screen housing, said base member further comprising a plurality of corners and a plurality of sides, said sides and corners defining an opening through which said screen area is viewable, b) a plurality of corner members disposed at the corners of said base member, c) a plurality of cover members disposed around said base member and positioned between said corner members, said cover members and portions of said base member adjacent said cover members defining a plurality of display chambers therebetween, and d) means for introducing image-bearing elements into said display chambers, e) wherein said cover members are removably connected to said base member and said corner members are fixed to said base member.

7. A border in accordance with claim 6, said border being movably positionable with respect to said screen from a first position adjacent said screen wherein said border substantially covers said screen housing, to a second position away from said screen for access to said screen housing.

8. A border for a screen having a screen area and a screen housing surrounding said screen area, said border comprising:

a) a base member adapted for engagement with said screen housing, said base member further comprising a plurality of corners and a plurality of sides, said sides and corners defining an opening through which said screen area is viewable, b) a plurality of corner members disposed at the corners of said base member, c) a plurality of cover members disposed around said base member and positioned between said corner members, said cover members and portions of said base member adjacent said cover members defining a plurality of display chambers therebetween, and d) means for introducing image-bearing elements into said display chambers, e) wherein said cover members and said corner members are connected to form a unitary display member, said unitary display member being removably attachable to said base member.

9. A border in accordance with claim 8, wherein said unitary display member is pivotally attached to said base member.

10. A border in accordance with claim 8, wherein said unitary display member is slidably engageable with said base member.

11. A border in accordance with claim 10, wherein said base member further comprises a guide slot and said unitary display member further comprises a guide lip capable of sliding along said guide slot.

12. A computer display screen having a screen housing and a screen area comprising:

a) a base member disposed around said screen housing, said base member further comprising a plurality of corners and a plurality of sides, said base member defining an opening through which said screen area is viewable, b) a plurality of corner members disposed at the corners of said base member and being removably attachable to said base member, said corner members adapted to receive decorative attachments for changing the appearance of said corner members, and c) a plurality of cover members disposed around said base member and positioned between said corner members, said cover members and portions of said base member adjacent said cover members defining a plurality of display chambers therebetween, said display chambers being adapted to receive image-bearing elements therein, said image-bearing elements being different than said decorative attachments.

13. A computer display screen in accordance with claim 12, wherein said cover members have a substantially semi-circular cross section.

14. A computer display screen in accordance with claim 12, wherein said cover members are transparent.

15. A computer display screen in accordance with claim 12, wherein said base member is movable relative to said computer display screen from a first position adjacent said computer display screen, wherein said base member substantially covers said screen housing, to a second position away from said computer display screen for access to said screen housing.

16. A computer display screen in accordance with claim 15, wherein said base member is pivotally connected to said screen housing and wherein said base member is upwardly pivotable from a first position that is substantially parallel to said screen housing, to a second position at an angle to said screen housing for gaining access to said screen housing.

17. A computer display screen in accordance with claim 12, wherein said base member is removably attachable to said computer display screen.

18. A computer display screen in accordance with claim 12, wherein said base member is integrally formed with said computer display screen.

19. A computer display screen in accordance with claim 12, wherein said display chambers are hingedly connected to said base member and said corner members are fixed to said base member.

20. A computer display screen in accordance with claim 12, further comprising slots positioned in said base member or said cover members for introducing image-bearing elements into said display chambers.

21. A computer display screen in accordance with claim 12, wherein said cover members and said corner members are connected to form a unitary display member.

* * * * *